(12) United States Patent
McKay (10) Patent No.: US 6,199,542 B1
(45) Date of Patent: Mar. 13, 2001

(54) FUEL TREATMENT APPARATUS

(75) Inventor: Allen R. McKay, Fargo, ND (US)

(73) Assignee: Webb Enterprises, West Fargo, ND (US)

( * ) Notice: Subject to any disclaimer, the term of this patent is extended or adjusted under 35 U.S.C. 154(b) by 0 days.

(21) Appl. No.: 09/138,800

(22) Filed: Aug. 24, 1998

(51) Int. Cl.[7] .......................... F02M 37/00; B01D 21/00
(52) U.S. Cl. ............................................ 123/557; 210/185
(58) Field of Search .................................. 123/557, 549; 210/180, 182, 184, 185, 255, 256, 252, 177, 175, 295; 165/157, 159, 163

(56) References Cited

U.S. PATENT DOCUMENTS

| | | | | |
|---|---|---|---|---|
| 4,338,907 | * | 7/1982 | Lindbeck | 123/557 |
| 4,368,716 | * | 1/1983 | Davis | 123/557 |
| 4,372,260 | * | 2/1983 | Baker | 123/142.5 E |
| 4,395,996 | * | 8/1983 | Davis | 123/557 |
| 4,421,090 | * | 12/1983 | Davis | 123/557 |
| 4,428,351 | * | 1/1984 | Davis | 123/557 |
| 4,510,051 | * | 4/1985 | Diry | 210/94 |
| 4,522,167 | | 6/1985 | Hurner | 123/196 S |
| 4,624,779 | | 11/1986 | Hurner | 210/185 |
| 4,664,088 | * | 5/1987 | Cantoni | 123/557 |
| 4,827,889 | * | 5/1989 | Ray | 123/557 |
| 4,933,093 | * | 6/1990 | Keller | 210/774 |
| 4,995,992 | | 2/1991 | Hurner | 210/803 |
| 5,098,560 | | 3/1992 | Hurner | 210/136 |
| 5,443,053 | * | 8/1995 | Johnson | 123/557 |
| 5,471,964 | | 12/1995 | Hurner | 123/557 |
| 5,682,661 | * | 11/1997 | Hurner | 29/402.08 |

* cited by examiner

Primary Examiner—Henry C. Yuen
Assistant Examiner—Hieu T. Vo
(74) Attorney, Agent, or Firm—Hardaway/Mann IP Group (57) ABSTRACT

A fuel treatment apparatus comprising a fuel heater assembly having: a body with a fuel inlet, fuel outlet and a fuel passageway in communication with the fuel inlet and fuel outlet; and a coolant inlet, coolant outlet and a coolant passageway in communication with the coolant inlet and coolant outlet. Coolant enters the coolant inlet; travels through the coolant passageway; and exits the coolant outlet. The coolant is used to heat the fuel. The fuel enters the fuel inlet; travels through the fuel passageway; and exits the fuel outlet. The fuel treatment apparatus also includes a demoisturizing assembly and a fuel filter assembly.

A method of treating fuel supplied to a vehicle engine comprising the steps of: providing a fuel treatment apparatus having an interconnected fuel heating assembly, fuel filter assembly, and fuel demoisturizing assembly; supplying fuel to the fuel treatment apparatus; supplying coolant to the treatment apparatus; heating the fuel within the fuel heating assembly; demoisturizing the fuel within the fuel demoisturizing assembly; filtering the fuel within the fuel filter assembly; and dispensing the fuel from the fuel treatment apparatus.

10 Claims, 5 Drawing Sheets

FUEL TREATMENT APPARATUS

CROSS-REFERENCE TO RELATED APPLICATIONS

This application is related to U.S. patent application Ser. No. 08/376,420, filed on Jan. 23, 1995 and issued as U.S. Pat. No. 5,682,661 on Nov. 4, 1997; and U.S. patent application Ser. No. 08/176,641, filed on Dec. 30, 1993 and issued as U.S. Pat. No. 5,471,964 on Dec. 5, 1995, both of which are herein incorporated by reference.

BACKGROUND OF THE INVENTION

The present invention relates generally to the art of vehicle engine fuel treatment. More particularly, the present invention relates to an apparatus for heating and demoisturizing fuel for improved flow and ignition properties in internal combustion engines.

The use of fuels, especially diesel fuel, is problematic in low temperature environments. For example, low temperatures can cause fuel to thicken and to become viscous. The pumping of thick and viscous fuel through a fuel system and into an engine can be difficult. Also, cold fuel is harder to ignite in the combustion chamber of an engine. Furthermore, any water present in the fuel can freeze and block the flow of fuel supplied to the vehicle engine.

A safe method of heating (i.e. warming) and demoisturizing the cold fuel before it is fed into the combustion chamber of an engine is desired. The use of heated and demoisturized fuel improves vehicle performance.

Many conventional heating devices exist that heat and/or demoist the fuel supplied to the vehicle engine. In fact, many of these heating devices were developed by the present applicant. However, a need still exists for further variety of heaters and demoisturizers.

SUMMARY OF THE INVENTION

Thus, it is an object of the present invention to provide an apparatus for treating fuel supplied to a vehicle engine.

It is a further object of the present invention to provide a fuel treatment apparatus that heats the fuel supplied to a vehicle engine.

It is a further object of the present invention to provide a fuel treatment apparatus that heats the fuel supplied to a vehicle engine using warmer engine coolant.

It is a further object of the present invention to provide a fuel treatment apparatus that demoisturizes the fuel supplied to a vehicle engine.

It is a further object of the present invention to provide a fuel treatment apparatus that provides a visual indication of the amount of restriction present in the fuel filter.

These and other objects are accomplished in a first aspect of the invention by a fuel treatment apparatus comprising: a fuel heater assembly having a body with a fuel inlet, fuel outlet and fuel passageway in communication with the fuel inlet and fuel outlet; and a coolant inlet, coolant outlet and coolant passageway in communication with the coolant inlet and coolant outlet. The coolant enters the coolant inlet; travels through the coolant passageway; and exits the coolant outlet. The coolant heats the fuel. The fuel enters the fuel inlet; travels through the fuel passageway; and exits the fuel outlet.

These and other objects are accomplished in a second aspect of the invention by a fuel treatment apparatus comprising: a body having: a fuel inlet; fuel inlet passage; at least one fuel through passage; fuel outlet passage; and a fuel outlet, all in communication with each other; a coolant inlet; coolant outlet; and coolant passageway in communication with the coolant inlet and coolant outlet. The fuel treatment apparatus also includes a fuel filter assembly having a cover attached to the body. The fuel filter cover has a chamber in communication with the at least one fuel through passage and the fuel outlet passage. The fuel filter cover can receive a fuel filter therein. The fuel treatment apparatus also includes a fuel demoisturizing assembly comprising a cover attached to the body. The fuel demoisturizing assembly cover has a chamber in communication with the fuel inlet passage and the at least one fuel through passage. Coolant can enter the coolant inlet; travel through the coolant passageway; and exit the coolant outlet. Fuel can enter the fuel inlet; travel through the fuel inlet passage into the fuel demoisturizing assembly; travel through the fuel through passage into the fuel filter assembly; travel through the fuel outlet passage; and exit the fuel outlet.

These and other objects are accomplished in a third aspect of the invention by a method of treating fuel supplied to a vehicle engine comprising the steps of: providing a fuel treatment apparatus having an interconnected fuel heating assembly, fuel filter assembly, and fuel demoisturizing assembly; supplying fuel to the fuel treatment apparatus; supplying coolant to the treatment apparatus; heating the fuel within the fuel heating assembly; demoisturizing the fuel within the fuel demoisturizing assembly; filtering the fuel within the fuel filter assembly; and dispensing the fuel from the fuel treatment apparatus.

BRIEF DESCRIPTION OF THE DRAWINGS

Other objects of the present invention will become apparent from the following description with reference to the accompanying drawings, wherein.

DETAILED DESCRIPTION OF THE PREFERRED EMBODIMENTS

A fuel treatment apparatus capable of heating and demoisturizing the fuel supplied to a vehicle engine will now be described with reference to FIGS. 1, 2 and 3A–D. In addition to the objects of the invention described above, other advantages and features will become apparent from a reading of the following description given with reference to the various figures of the drawings.

The present invention is directed to a fuel treatment apparatus 10. Fuel treatment apparatus 10 is part of the overall fuel system of an internal combustion engine (not shown) of a vehicle (not shown). Fuel treatment apparatus 10 connects to a fuel system (not shown) and a coolant system (not shown) of the vehicle.

Figure 1:
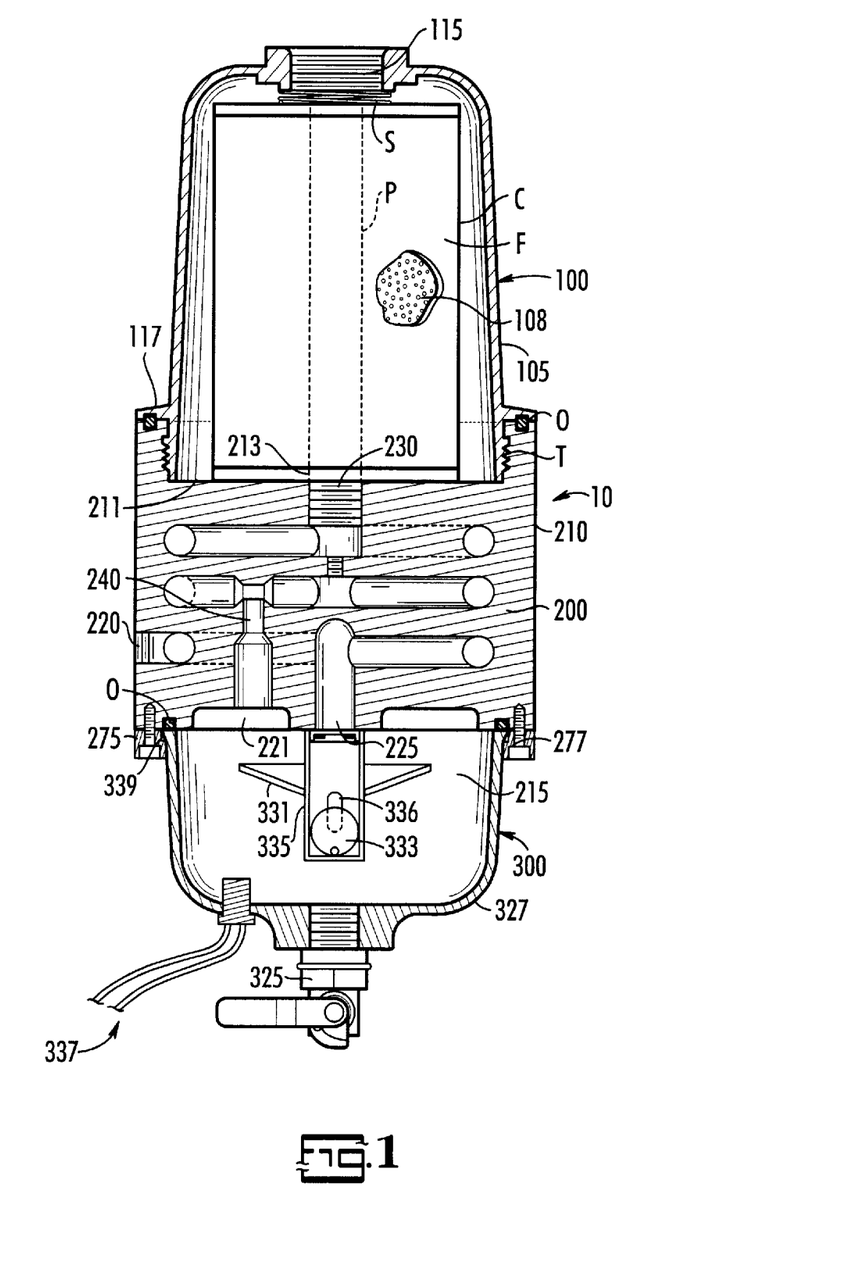
FIG. 1 is an elevational, cross-sectional view of the fuel treatment apparatus of the present invention.
Figure 2:
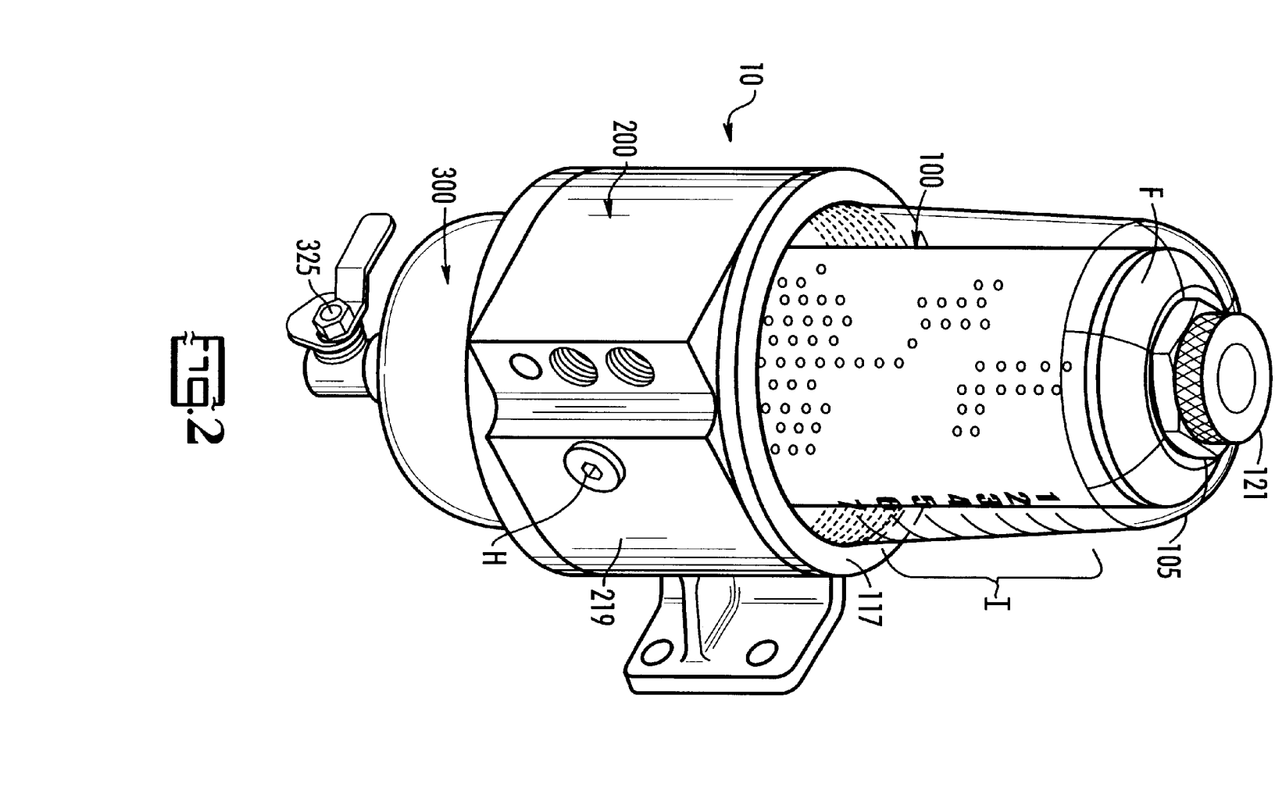
FIG. 2 is a perspective view of the fuel heater portion of the present invention.

As shown in FIGS. 1 and 2, fuel treatment apparatus 10 has three sub-assemblies. Generally, fuel treatment apparatus 10 is a closed system comprising a filter assembly 100, heater assembly 200, and a demoisturizing assembly 300. Filter assembly 100, heater assembly 200 and demoisturizing assembly 300 interact to treat fuel (not shown) being supplied to the engine from the fuel system. Each of the sub-assemblies will be individually described in greater detail below. Then, the interaction of the three sub-assemblies will be described.

Filter assembly 100 will now be described with reference to FIGS. 1 and 2. Filter assembly 100 includes a cup-shaped cover 105 that is secured to a body 210 of heater assembly 200. The annular end of cover 105 has threads for securing to complementary threads T on body 210. A square shape O-ring O is placed between a flange 117 on cover 105 and body 210 to ensure a seal between filter assembly 100 and heater assembly 200. O-ring O prevents the exposure of threads T to the environment, eliminates the possibility of contaminating the fuel with foreign materials, and provides a seal to atmosphere.

Cover 105 has an opening 115 at an opposite end. Opening 115 is preferably threaded to receive a priming plug 121 therein. Priming plug 121 can be removed to allow an operator to insert fuel into the chamber to maintain prime.

When cover 105 is secured to body 210, a chamber forms between cover 105 and heater assembly 200. Cover 105 can be transparent to allow visual inspection of the chamber and fuel filter F within the chamber. A fuel filter F resides within the chamber.

Any type of conventional fuel filter can be used with the present invention. The figures show the use of a cartridge-type fuel filter. However, applicant recognizes that fuel treatment apparatus 10 can accept other types of fuel filters, including, for example, spin-on filters. The present invention could operate with cartridge fuel filter model number 6732, FS1005 or spin-on fuel filter model number FF105, both from WEBB, Inc. of West Fargo, N. Dak.

If fuel treatment apparatus 10 uses a cartridge fuel filter, then filter assembly 100 should include a spring S as shown in FIGS. 1. Spring S, disposed between cover 105 and fuel filter F, biases fuel filter F against body 210 of heater assembly 200 to prevent a gap between filter assembly 100 and heater assembly 200. By properly seating filter F against body 210, spring S forces unfiltered fuel to enter filter F before exiting filter assembly 100.

If, however, fuel treatment apparatus 10 uses a spin-on fuel filter (not shown), then fuel outlet passage 230 should be threaded (as shown in FIG. 1). The threaded engagement of the filter F to body 210 prevents unfiltered fuel from exiting filter assembly 100. A grommet (not shown) seated on upper surface 211 of body 210 can assist the connection between a cartridge filter F and heater assembly 200. The grommet would sit on a raised area 213 surrounding fuel outlet passage 230.

Regardless of the type of fuel filter used, fuel filter F operates as follows. Fuel (not shown) is pumped into the filter assembly chamber through fuel through passages 233. The fuel travels around the outside circumferential walls C of filter F. The fuel then enters small filtering holes 108 in outer circumferential walls C of filter F and passes through the filter material. Next, the fuel enters a passage P in the center of filter F. At this point, fuel exits filter assembly 100 and enters heater assembly 200. Fuel filter F traps any contaminants that were present in the fuel.

Filter assembly 100 can also have indicia I thereon to alert an operator to replace fuel filter F. As seen in FIG. 2, indicia I preferably comprises a series of numbered gradations on an exterior surface of cover 105. Indicia I provides an indication of the amount of restriction within fuel filter F. When fuel filter F is relatively new, the fuel flows easily through filter F. Without restriction by fuel filter F, the level of fuel present within the chamber of cover 105 is low. For example, the level of fuel within cover 105 could be near the gradation numbered six (6) or seven (7) with a new fuel filter F. Throughout its life, contaminants build up within fuel filter F. As a result, fuel flow becomes increasingly restricted, causing the level of fuel within cover 105 to increase. As fuel filter F traps more contaminants, the level of fuel within cover 105 progresses towards lower numbered gradations.

In light of the trend of the level of fuel within cover 105 towards the lower numbered gradations, indicia I can be used to alert the operator to replace fuel filter F. For example, the operator will replace fuel filter F when the level of fuel within cover 105 reaches the gradation numbered two (2) or three (3). Applicant recognizes that indicia I is not limited merely to numbered gradations. Other types of indicia and other arrangements of the indicia are possible. In addition, indicia I is not limited to placement on the outer surface of cover 105. For instance, indicia I could be placed on the exterior surface of fuel filter F (not shown).

Heater assembly 200 will now be described. Heater assembly 200 is preferably formed as a unitary body 210, preferably cast from a heat conductive material such as aluminum. However, Applicants also envision other methods of manufacture. Body 210 contains the primary fluid entrances and exits to the closed system of fuel treatment apparatus 10.

Body 210 has two sets of passages therethrough. The first set of passages receive the fuel being supplied to the engine. The second set of passages receive the coolant typically used to dissipate heat in the engine. In the present invention, the coolant has the additional function of warming the fuel prior to its entering the engine. When apparatus 10 is in use, the fuel passages and the coolant passages in body 210 do not commingle. This prevents contamination of the fuel with coolant. During manufacture of body 210, passages used for the fuel and for the coolant may communicate for ease of construction. However, during assembly the sections that communicate between the fuel passages and the coolant passages will be blocked to prevent commingling of the fuel and the coolant during operation of apparatus 10.

The fuel passages of body 210 will now be described. Body 210 has a fuel inlet 220; fuel inlet passageway 225; fuel outlet passageway 230; fuel outlet 235; and fuel through passages 233. Fuel inlet 220 and fuel outlet 235 attach to fuel lines (not shown) supplying fuel from the fuel tank (not shown) to the engine in any conventional manner. For example, fuel inlet 220 and outlet 235 could be threaded to secure the fuel lines thereto. Alternatively, fuel inlet 220 and fuel outlet 235 could have hose fittings (not shown) to secure fuel lines thereto.

Figure 3A:
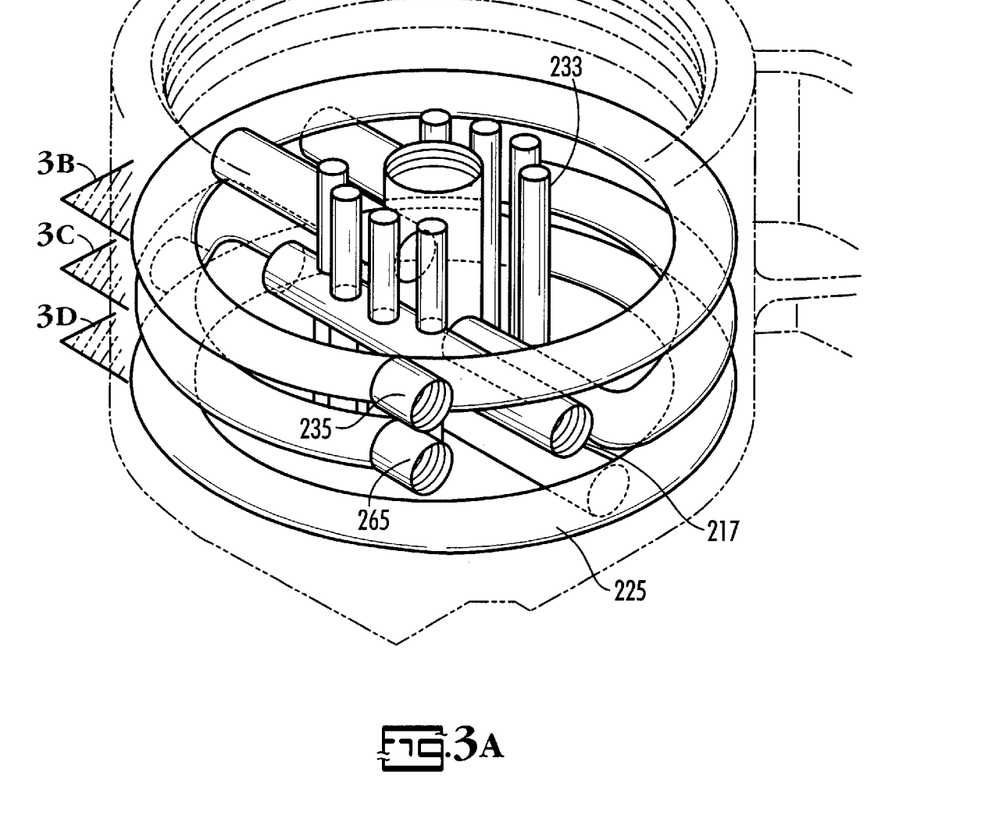
FIG. 3A is a perspective view, in partial phantom, of the fuel heater portion of the present invention showing the passages therein.

Fuel inlet passageway 225 communicates with fuel inlet 220. Fuel inlet passageway 225 traverses body 210 in serpentine fashion. As seen in FIG. 3D, fuel inlet passageway 225 includes a circumferential portion extending around body 210 along its outer wall; a radial portion extending from the circumferential portion inwardly towards the center of body 210; and an axial portion extending along the center of body 210 from the radial portion towards a lower surface 215. As the fuel enters body 210 from fuel inlet 220, the fuel travels through the circumferential portions, then the radial portion, and finally the axial portion of fuel passageway 225 to exit body 210 at a lower surface 215. Upon exiting fuel inlet passageways 225 at lower surface 215, the fuel enters demoisturizing assembly 300. Demoisturizing assembly 300 will be described later.

Figure 3B:
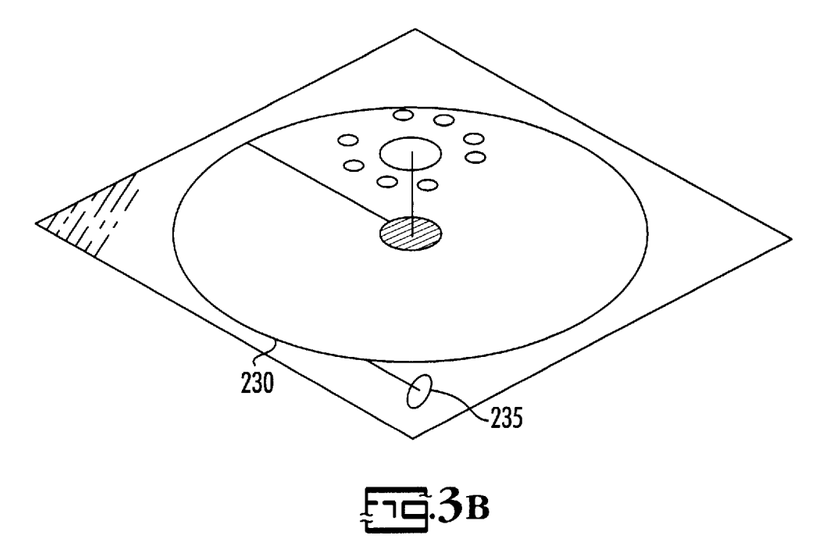
FIG. 3B is a schematic of the passages within the fuel heater portion of the present invention at one elevation.
Figure 3C:
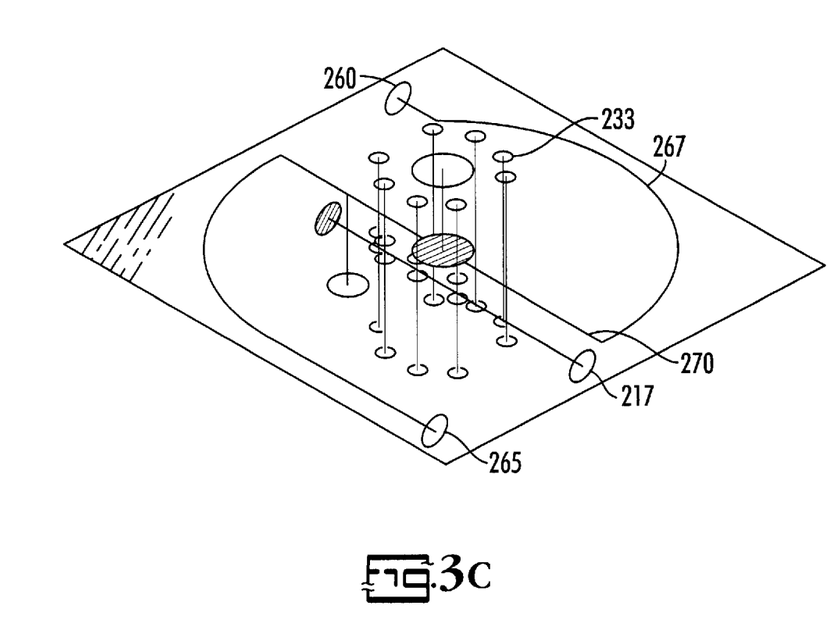
FIG. 3C is a schematic of the passages within the fuel heater portion of the present invention at a different elevation.
Figure 3D:
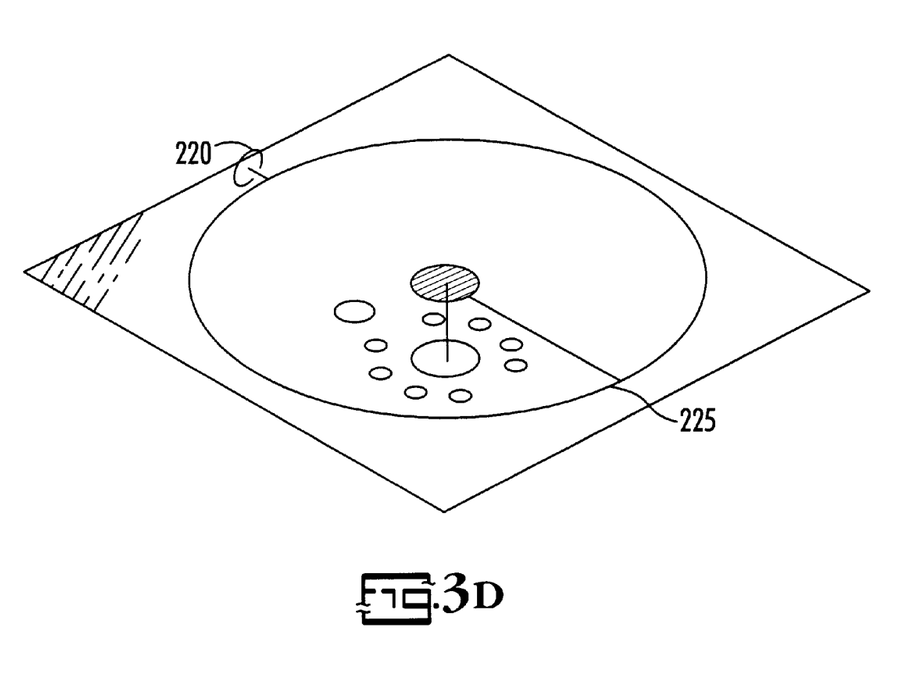
FIG. 3D is a schematic of the passages within the fuel heater portion of the present invention at a third elevation.

As seen in FIG. 3B, fuel outlet passageway 230 communicates with fuel outlet 235. Similar to fuel inlet passageway 225, fuel outlet passageway 230 includes a circumferential portion extending around body 210 along its outer wall; a radial portion extending between the circumferential portion and the center of body 210; and an axial portion extending along the center of body 210 between the radial portion and upper surface 211. Once passing through filter F, the fuel enters body 210 through the axial portion, then the radial portion, then the circumferential portion of fuel outlet passageway 230, and finally exits through fuel outlet 235. Once exiting fuel treatment apparatus 10, the fuel travels to the engine for combustion.

Fuel through passages 233 span body 210 between upper surface 211 and lower surface 215. FIG. 3A shows fuel through passages 233 as vertically arranged passages flanking fuel inlet passage 225 and fuel outlet passage 235. However, fuel through passages 233 are not limited to the vertical arrangement shown in the figures. Any desired path can be used, so long as it avoids interaction with the coolant passages and avoids interaction with fuel outlet passage 235. Likewise, any number of fuel through passages 233 can be utilized. FIG. 3A demonstrates heater assembly 200 having eight (8) fuel through passages 233.

Body 210 also includes an additional passageway 217 in a side surface 219 of body 210. Passageway 217 preferably communicates with at least one of the fuel through passages 233. Passageway 217 can accommodate a pre-heater H. Any pre-heater, such as a 120 Volt, 63 Watt WEBB model number 120EK, could be used with the present invention. Pre-heater H operates prior to engine start-up. Pre-heater H, since it contacts body 210, acts as an adjunct to the coolant during engine warm-up to heat body 210 until the coolant is sufficiently warmed. In addition, since pre-heater H also contacts the fuel, pre-heater H warms the fuel in body 210, filter assembly 100 and demoisturizing assembly 300 to allow movement of the fuel through apparatus 10 during initial engine warm-up.

Lower surface 215 can include recesses 221 therein. Recesses 221 can extend substantially towards upper surface 213 in any desired shaped, so long as there is no interference with any of the fuel of coolant passages. Recesses 221 increase the amount of surface area that the fuel can contact while traveling through apparatus 10. As a result, the fuel has a greater opportunity to absorb heat transferred from the coolant to body 210. Recesses 221 also help reduce the weight of apparatus 10.

Arrangements of the fuel passages other than the specific arrangement shown in the figures are possible. Any alternative arrangement is possible, so long as the fuel passages avoid interaction with the coolant passages, and the filtered fuel (i.e. already passed through filter F) avoids interaction with the unfiltered fuel (i.e. has not yet passed through filter F).

The coolant passages will now be described. Body 210 has a coolant inlet 260, a thermostat receiving aperture 240, a coolant outlet passage 265, circumferential passages 267 and a coolant cross-passage 270. Thermostat receiving aperture 240 preferably communicates with coolant cross passage 270. The coolant passages are in fluid communication to create a coolant path. The coolant passages do not intermingle with the fuel passages. Any communication between the fuel passages and the coolant passages created during manufacture of body 210 are sealed (e.g. using a plug or sealant) prior to installation on a vehicle.

Engine coolant (not shown) enters body 210 through coolant inlet 260; enters a circumferential passage 267 extending partially around body 210 along its outer wall; then enters cross-passage 270 extending radially between opposite sides of body 210. If the fuel temperature is sufficiently high, the thermostat will block cross-passage 270, preventing further movement of the coolant through body 210. If the fuel temperature is sufficiently low, the thermostat will allow the coolant to travel the remainder of cross-passage 270 and into the other circumferential passage 267 extending around the remainder of body 210 along its outer wall, finally exiting body 210 through fuel outlet 265.

As seen in FIG. 1, the coolant passages reside at an elevation on body 210 between fuel inlet passageways and fuel outlet passageways. In addition, coolant cross-passage 270 extends between fuel through passages 233. Circumferential passages 267 radially encircle fuel through passages 233. This ensures sufficient heat transfer between the coolant, body 210 and the fuel. However, the specific arrangement of the coolant passages is not limited to what is shown in the figures. Applicants recognize that any arrangement could be utilized that prevents the intermingling of coolant and fuel; provides adequate heat transfer between the coolant, body 210 and the fuel; or is easily manufacturable.

As seen in FIG. 1, passage 240 extends from lower surface 215 of body 210 to cross-passage 270. Passage 240 accommodates a thermostat (not shown) which can block the flow of coolant through body 210 at a given fuel temperature. Any of the known thermostats can be used with the present invention, including a WEBB model number ACV3630A thermostat control valve. In use, the thermostat prevents the mingling of the fuel and the coolant through aperture 240.

An annular retaining ring 275 secures demoisturizing assembly 300 to body 210. Suitable fasteners secure ring 275 to body 210. A shoulder 277 on the inner periphery of ring 275 can seat an annular flange 339 that extends from the open end of base 327. An O-ring O is inserted within a groove on lower surface 215 of body 210. As the fasteners tighten, annular ring 275 and flange 339 seat against body 210. O-ring O provides a seal between body 210, ring 275 and demoisturizing assembly 300 to prevent fuel leaks.

Demoisturizing assembly 300 will now be generally described with reference to FIG. 1. A detailed description of the demoisturizing assembly is provided in U.S. patent application Ser. No. 08/376,420, which is herein incorporated by reference.

Demoisturizing assembly 300 includes a cup-shaped base 327. The open end of base 327 includes an annular flange 339, the purpose of which was described earlier. When secured to body 210, a chamber forms between base 327 and body 210. Base 327 may be transparent for visual detection of fuel and/or water within the chamber. Base 327 has a conventional drain valve 325 attached at its lowermost portion to remove any water that has collected within the chamber.

Demoisturizing assembly 300 also includes a conduit 335 secured to lower surface 215 of body 210. Conduit 335 is in fluid communication with fuel inlet channel 225. Conduit 335 houses a floating check ball 333. Floating check ball 333 floats to the top of conduit 335 when no fuel is flowing within fuel treatment apparatus 10 in order to maintain prime during the removal of water from demoisturizing assembly 300. When fuel flows through fuel treatment apparatus 10, floating check ball 333 is forced to the bottom of conduit 335 by the flow of fuel.

Conduit 335 has a plurality of slots 336 therein. Slots 336 are positioned on conduit 335 so that when floating check ball 333 is forced to the bottom of conduit 335, the fuel enters conduit 335 from fuel inlet channel 225 and exits through slots 336 into the chamber.

A coalescer plate 331 is secured to the outer surface of conduit 335. Coalescer plate 331 is spaced away from lower surface 215 of body 210. Coalescer plate 331 extends radially outward from conduit 335. Preferably, the radially outermost extent of coalescer plate 331 is further outward than the location of fuel through passages 233. The arrangement of coalescer plate 331 within the chamber requires the fuel to pass between the gap formed by coalescer plate 331 and body 210 before entering fuel through passages 233.

The central portion of coalescer plate 331 (i.e. where coalescer plate 331 contacts conduit 335) is the lowest point along coalescer plate 331. The radially outermost portion of coalescer plate 331 is the highest point along coalescer plate 331. An aperture (not shown) extends through coalescer plate 331 near the central portion of coalescer plate 331. A drain tube (not shown) preferably extends downwardly from the aperture.

Since coalescer plate 331 is positioned below fuel through passages 233, any water that drops from fuel through passages 233 will also collect on the upper surface of coalescer plate 331. The water in the chamber will gravitate towards the lowest point of coalescer plate 331. The trapped water will enter the drain tube and collect at the bottom of base 327. The trapped water can then be released from fuel treatment assembly 10 using drain valve 325.

Although described with respect to a particular demoisturizing assembly 300, Applicants recognize that other types of demoisturizing assemblies could be used.

The operation of fuel treatment apparatus 10 (i.e. the interaction of filter assembly 100, heater assembly 200 and demoisturizing assembly 300) will now be described. The fuel treatment apparatus 10 both filters and heats the fuel. During normal operation, fuel from the vehicle's fuel tank initially enters body 210 at fuel inlet 220, travels through body 210 and exits into demoisturizing assembly 300. While inside body 210, the fuel is warmed either by the preheater (during engine warm-up) or the coolant (after warm-up)

Demoisturizing assembly 300 removes water from the fuel using coalescer plate 331 as previously described. The water-free fuel reenters body 210, travelling through fuel through passages 233 to filter assembly 100. The fuel is warmed further while again passing through body 210.

Filter assembly 100 removes contaminants from the fuel. The fuel reenters body 210 through fuel outlet passage 230. For the third time, the fuel is warmed while passing through body 210. The fuel exits fuel treatment assembly 10 from fuel outlet 235 for subsequent use in a vehicle engine.

Fuel treatment assembly 10 heats the fuel by either the preheater (during warm-up) or by warm engine coolant (after warm-up). Heating the fuel allows the fuel to both flow better through fuel treatment apparatus 10 and ignite easier upon reaching the combustion chamber of the internal combustion engine. Thus, it is clearly seen that the fuel can be warmed during the several passes through fuel treatment apparatus 10.

The preferred embodiment of the present invention can provide approximately a 60° F. temperature rise in the fuel. This temperature rise is sufficient to separate water from the fuel even when the fuel temperature is below 0° F. Once the fuel is sufficiently warmed, the thermostat stops the flow of coolant into body 210.

The interaction between fuel and water; fuel flow rate; and the size of through passages 233 ensures that the water will drop from fuel through passages 233 against the flow of fuel. Water droplets are fairly large in diesel fuel. Furthermore, the water droplets tend to attract other water droplets, forming even larger water droplets. These large water droplets overcome fuel flow velocity and buoyancy to drop from fuel through passages 233 despite fuel flow velocity. For instance, in a vehicle having a 50 gallon per hour fuel flow, a water droplet having a diameter of approximately 0.24" will drop from an apparatus having eight fuel through passages each having a diameter of approximately 0.312".

While reference has been made to specific locations of coolant passages and fuel passages, the invention is not so limited. Any means by which warm coolant may be passed through unitary block 210 to warm the block and/or the fuel so that the engine fuel is heated for easier flow and/or ignition is meant to be covered under the teachings of the invention. There is much room for variance while keeping within the teachings of this invention.

Applicant also contemplates other variations of fuel treatment apparatus 10. For example, body 210 can be formed with an integral cast bracket for attaching to a vehicle V. Demoisturizing assembly 300 may also include a water sensor 337 as shown in FIG. 1. Once trapped water collect sufficiently to reach the level of sensor 337, sensor 337 signals the driver of vehicle V to drain demoisturizing assembly 300.

The above description is given in reference to a fuel system with a fuel treatment apparatus having a unitary fuel heater. However, it is understood that many other variations are apparent to one of ordinary skill in the art from a reading of the above specification and such variations are within the spirit and scope of the instant invention as defined by the following appended claims.

I claim:

1. A fuel treatment apparatus comprising:
a fuel heating apparatus, comprising:
a unitary metallic body defining
a fuel inlet, a coolant outlet, and a coolant passageway in communication with a coolant inlet and said coolant outlet;
a fuel filter assembly comprising a cover attached to said body, said fuel filter cover having a chamber in communication with at least one fuel through passage and a fuel outlet passage, said fuel filter cover adapted to receive a fuel filter therein; and
a fuel demoisturizing assembly comprising a cover attached to said body, said fuel demoisturizing assembly cover having a chamber in communication with a fuel inlet passage and said at least one fuel through passage;
wherein coolant enters said coolant inlet; travels through said coolant passageways, and exits said coolant outlet, and transfers heat to said unitary metallic body and
wherein fuel enters said fuel inlet, travels through said fuel inlet passage and is heated therein and flows into said fuel demoisturizing assembly, fuel filter assembly, through said fuel through passage into said fuel filter assembly, through said fuel outlet passage.

2. The fuel treatment apparatus as recited in claim 1, wherein said fuel demoisturizing assembly further comprises a drain valve connected to said fuel demoisturizing assembly cover for removing water from said fuel demoisturizing chamber.

3. The fuel treatment apparatus as recited in claim 1, wherein said coolant passageway surrounds at least one of said fuel inlet, said fuel inlet passage, said at least one fuel through passage; said fuel outlet passage; and said fuel outlet.

4. The fuel treatment apparatus as recited in claim 1, wherein said coolant passageway surrounds said fuel inlet passage, said at least one fuel through passage; and said fuel outlet passage.

5. The fuel treatment apparatus as recited in claim 1, wherein each of said fuel inlet, said fuel inlet passage, said at least one fuel through passage, said fuel outlet passage and said fuel outlet remain separate from each of said coolant inlet, coolant passageway and said coolant outlet.

6. The fuel treatment apparatus as recited in claim 1, wherein said body further comprises a heating element receiving aperture therein adapted to receive a heating element.

7. The fuel treatment apparatus as recited in claim 1, wherein said body further comprises a thermostat receiving passageway therein and in communication with one of said coolant inlet, said coolant passageway and said coolant outlet, said thermostat receiving passageway adapted to receive a thermostat.

8. The fuel treatment apparatus as recited in claim 1, wherein said fuel filter assembly further comprises indicia thereon to alert an operator to replace said fuel filter.

9. A method of treating fuel supplied to a vehicle engine comprising the steps of:

providing a fuel treatment apparatus having an interconnected fuel heating body, a fuel filter assembly, and a fuel demoisturizing assembly, said fuel heating body being formed from a unitary metallic body;

supplying fuel to said fuel heating body;

supplying coolant to said fuel heating body to heat said body;

heating said fuel within said fuel heating body;

demoisturizing said fuel within said fuel demoisturizing assembly;

filtering said fuel within said fuel filter assembly; and dispensing said fuel from said fuel treatment apparatus.

10. The method of treating fuel supplied to a vehicle engine as recited in claim 6, wherein said heating step is performed at least prior to said demoisturizing step; after said demoisturizing step and before said filtering step; and after said filtering step.

* * * * *